US006988332B2

(12) United States Patent
Harvey (10) Patent No.: US 6,988,332 B2
(45) Date of Patent: Jan. 24, 2006

(54) AIR DRIVEN LIQUID PUMP

(76) Inventor: Jules Harvey, 11325, Marie-Victorin, Sorel-Tracy (CA) J3P 5N3

( * ) Notice: Subject to any disclaimer, the term of this patent is extended or adjusted under 35 U.S.C. 154(b) by 7 days.

(21) Appl. No.: 10/753,310

(22) Filed: Jan. 9, 2004

(65) Prior Publication Data

US 2004/0139651 A1    Jul. 22, 2004

(30) Foreign Application Priority Data

Jan. 10, 2003    (GB) .................................... 0300520

(51) Int. Cl.
*A01G 23/10* (2006.01)
*A01G 23/14* (2006.01)
(52) U.S. Cl. .............................. 47/10; 47/50; 417/130; 417/134; 417/136
(58) Field of Classification Search .................... 47/50, 47/10, 11, 12; 417/118, 120, 128, 130, 138, 417/137, 148, 133, 134, 136; 119/14.24, 119/14.25, 77, 78
See application file for complete search history.

(56) References Cited

U.S. PATENT DOCUMENTS

| 5,074,758 A | * | 12/1991 | McIntyre | 417/138 |
| 5,078,579 A | * | 1/1992 | Ryan | 417/126 |
| 5,487,647 A | * | 1/1996 | Breslin | 417/131 |

FOREIGN PATENT DOCUMENTS

CA        1098720 A    *    4/1981

* cited by examiner

*Primary Examiner*—Jeffrey L. Gellner (57) ABSTRACT

An air driven liquid pump includes a reservoir, a liquid inlet aperture extending through the reservoir wall for fluid coupling to a liquid inlet duct, a liquid outlet aperture extending through the reservoir wall for fluid coupling to a liquid outlet duct. The liquid outlet aperture is in fluid communication with an outlet level inside the reservoir chamber located below the liquid inlet aperture and corresponding to a predetermined lower threshold value of the volume of the liquid within the reservoir chamber. The liquid pump also includes an air aperture extending through the reservoir wall for pneumatically coupling the reservoir chamber with the atmospheric air located exteriorly to the reservoir, a liquid inlet valve operationally coupled to the liquid inlet aperture and an air valve operatively coupled to the air aperture. A volume responsive first actuating mechanism is provided for selectively moving the liquid inlet valve to the liquid valve closed configuration and the air valve to the air valve open configuration upon the volume of liquid within the reservoir reaching a predetermined upper threshold value. A volume and pressure responsive second actuating mechanism is provided for selectively moving the liquid inlet valve to the liquid valve open configuration and the air valve to the air valve closed configuration upon the volume of liquid within the reservoir reaching the predetermined lower threshold value and the pressure differential between the air pressure inside and outside the reservoir reaching a predetermined differential threshold.

18 Claims, 6 Drawing Sheets

Fig. 6

AIR DRIVEN LIQUID PUMP

FIELD OF THE INVENTION

The present invention relates to the general field of maple sap collecting equipment and is particularly concerned with an air driven pump.

BACKGROUND OF THE INVENTION

Since the days of the colonists, in the Northern United States and Canada, maple syrup and related sugar products have been manufactured by tapping maple sap from hard maple trees (Acer Saccharinum) typically in late winter or early spring. Heat is then applied from an open fire or confined flame against the bottom of a vaporizer tank or tub within which the maple tree sap is placed to concentrate the sap and produce maple syrup.

Indeed, maple sap containing 2% to 3% sugar as it comes from the tree has no maple flavor and no color. The characteristic flavor and maple color result from the reactions that occur when the maple sap is evaporated and concentrated to the syrup form by boiling.

Typically, the maple sap is fed into an upwardly open flue pan supported over a wood or coal fire and collecting the concentrated maple syrup which failed to be evaporated by the evaporation process. Evaporators of every type are used to manufacture maple sugar, sorghum and similar types of syrup or sugar products.

Maple syrup sugar producers are typically individuals or families working in so-called "sugar shacks" sometimes with limited electrical power. Maple sap is typically carried from the maple tree to the sugar shack either by conventional methods using horses to carry the sap collected in buckets through the sometimes rugged terrain leading to the shack or through a more modern method using hydraulic lines fluidly coupled both to the maple tree at one end and to a collecting vessel adjacent the sugar shack.

When the more modem method using fluid tubes or lines is favored, the maple sap emanating from the trees, commonly referred to as maple water, is carried through the hydraulic line towards the sugar shack by gravity. Although a negative pressure or vacuum is created in the hydraulic line, the vacuum is used essentially for extracting the sap from the maple tree as opposed to being used for carrying the sap towards the sugar shack.

Accordingly, sugar shacks are typically located at a low level terrain relative to the trees being sapped. However, even in ideal situations wherein the sapped trees are all located above the sugar shack, there sometimes exists a situation wherein the hydraulic line, because of the rugged terrain, must travel at a level lower than that of the sugar shack.

Hence, in such situations, maintaining proper flow of the sugar water to the sugar shack becomes problematic. Accordingly, there exists a need for providing a suitable method of somehow pumping the maple water located at a level underneath a sugar shack to a level higher than the latter so that the sap collecting system may continue to use gravity to induce flow of the maple water towards the sugar shack.

Several types of mechanical pumping mechanisms for transferring fluid from a lower to a higher level are known and are in wide use. Two of the most common types of pumps are the so-called dynamic or momentum-change pumps and the so-called positive displacement pumps.

Dynamic pumps add momentum to a fluid by means of rapidly moving blades, fans or the like. As the fluid moves through open passages and discharges into a diffuser section, its momentum is increased and its velocity converted into an increased pressure. Dynamic pumps include rotodynamic or rotary type pumps such as axial flow, centrifugal or radial exit flow and mixed flow pumps. They also include so-called injector pumps, fluid activated types such as gas lift and hydraulic ram pumps and electromagnetic pumps.

Positive displacement pumps all generally have some types of moving boundary that forces fluid to move by volume changes. The fluid is admitted through an inlet into a cavity, which then closes, and the fluid is squeezed through an outlet. Common examples of positive displacement pumps include reciprocating and rotary types. Reciprocating types use a plunger, a piston or diaphragm as the moving boundary. Rotary types use one or more sliding vanes, helical screws, gears or the like.

Such conventional pumps require several moving components having a relatively large mass or density. These components are subject to relative large accelerations and frictions require costly and time-consuming maintenance and are also prone to wear and vibrations. Typically, they also require elaborate lubrication, cooling and control systems involving additional components. Also, they usually typically require some means for priming the system prior to effective operation and are subject to damage due to neglect by the operator.

Accordingly, they are not well-suited to being used in the specific context of maple sap hydraulic lines. They are also not suitable for many other types of contexts requiring a relatively simple yet effective means of locally increasing the level of a liquid in a hydraulic system subjected to a vacuum. Accordingly, there exists a need for a maple sap collecting line pumping system.

SUMMARY OF THE INVENTION

It is general object of the present invention to provide an improved air driven liquid pump that can be used maple sap collecting line pumping system or any other suitable context.

In accordance with the present invention, there is provided an air driven liquid pump for pumping a target volume of liquid emanating from a liquid inlet duct into a liquid outlet duct, both the liquid inlet and outlet ducts being subjected to at least a partial air vacuum, the liquid inlet and outlet ducts being fluidly coupled together respectively upstream from the liquid pump and downstream from the liquid pump by a by-pass duct extending therebetween, the liquid pump comprising: a reservoir having a reservoir wall enclosing a reservoir chamber; a liquid inlet aperture extending through the reservoir wall for fluid coupling to the liquid inlet duct; a liquid outlet aperture extending through the reservoir wall for fluid coupling to the liquid outlet duct, the liquid outlet aperture being in fluid communication with an outlet level inside the reservoir chamber located below the liquid inlet aperture and corresponding to a predetermined lower threshold value of the volume of the liquid within the reservoir chamber; an air aperture extending through the reservoir wall for pneumatically coupling the reservoir chamber with the atmospheric air located exteriorly to the reservoir; a liquid inlet valve operationally coupled to the liquid inlet aperture, the liquid inlet valve being operable between a liquid valve open configuration and a liquid valve closed configurations for respectively allowing and preventing the flow of a fluid through the liquid inlet aperture; an air valve operatively coupled to the air aperture, the air valve being operable between an air valve open configuration and an air valve closed configurations for respectively allowing and preventing the flow of air through the air aperture; a volume responsive first actuating means for selectively moving the liquid inlet valve to the liquid valve closed configuration and the air valve to the air valve open configuration upon the volume of liquid within the reservoir reaching a predetermined upper threshold value; a volume and pressure responsive second actuating means for selectively moving the liquid inlet valve to the liquid valve open configuration and the air valve to the air valve closed configuration upon the volume of liquid within the reservoir reaching the predetermined lower threshold value and the pressure differential between the air pressure inside and outside the reservoir reaching a predetermined differential threshold; whereby with the liquid inlet valve in the liquid valve open configuration and the air valve in the air valve closed configuration the liquid is allowed to flow into the reservoir chamber for filling the latter while the pressure inside the reservoir chamber is lowered by the at least partial air vacuum at a level lower then that of the atmospheric pressure outside the reservoir so as to create a pressure differential therebetween, when the volume of liquid within the reservoir chamber reaches the predetermined upper threshold value the first actuating means opens the air valve allowing the air pressure inside the reservoir chamber to rise so as to pump out the liquid inside the reservoir chamber through the liquid outlet aperture and, the first actuating means also substantially simultaneously; closes the liquid inlet valve so as to prevent liquid flow into the reservoir and so as to maintain the at least partial vacuum in the liquid inlet duct through the by-pass duct for maintaining the liquid inlet valve in the liquid valve closed configuration while the liquid is being pumped out of the reservoir chamber, when the volume of liquid inside the reservoir chamber falls to the lower threshold value, the air now allowed to flow out of the reservoir chamber through the liquid outlet aperture lowers the pressure inside the reservoir chamber to the predetermined differential threshold allowing the second actuating means to move the liquid inlet valve to the liquid valve open configuration and the air valve to the air valve closed configuration for a new cycle to begin.

Typically, the liquid pump further comprises a float component mounted within the reservoir chamber for buoyantly moving within the reservoir chamber according to the level of liquid contained therein, the float component allowing selective opening and closing of the liquid inlet valve depending on the level of liquid contained in the reservoir chamber.

Conveniently, the liquid pump further comprises a float component mounted within the reservoir chamber for buoyantly moving within the reservoir chamber according to the level of liquid contained therein, the float component allowing selective opening and closing of the air valve depending on the level of liquid contained in the reservoir chamber.

Typically, the liquid pump further comprises a float component mounted within the reservoir chamber for buoyantly moving within the reservoir chamber according to the level of liquid contained therein, the float component allowing selective opening and closing of the liquid inlet valve depending on the level of liquid contained in the reservoir chamber; the liquid inlet valve including a liquid valve seat, the float component including a liquid valve sealing plate for abuttingly and sealingly contacting the liquid valve seat when the level of liquid contained within the reservoir chamber reaches the predetermined upper threshold value.

Conveniently, the float component includes a float component buoyant section pivotally attached to the reservoir wall by a pivotable float arm, the liquid valve sealing plate being mechanically coupled to the float arm, the liquid valve sealing plate being configured, sized and positioned so as to abuttingly and sealingly contact the liquid valve seat when the level of liquid contained within the reservoir chamber reaches the predetermined upper threshold value.

Typically, the reservoir wall includes a wall upper segment, the liquid inlet aperture extending through the wall upper segment, the float arm being pivotally attached to the wall upper segment; the float arm including an arm actuating segment and a substantially perpendicular arm spacing segment, the liquid valve sealing disc being mounted on the arm actuating segment.

Conveniently, the liquid pump further comprises a float component mounted within the reservoir chamber for buoyantly moving within the reservoir chamber according to the level of liquid contained therein, the float component allowing selective opening and closing of the air valve depending on the level of liquid contained in the reservoir chamber; the air valve including an air valve seat and an air valve sealing plate for abuttingly and sealingly contacting the air valve seat when the air valve is in the air valve closed configuration; the float component being adapted to move the air valve sealing plate away from the air valve seat when the level of liquid contained within the reservoir chamber reaches the predetermined upper threshold value.

Typically, the air valve includes an air valve actuating arm, the air valve actuating arm being attached adjacent a longitudinal end thereof to the air valve sealing plate, the air valve actuating arm having an opposed distal end thereof extending into the reservoir chamber for contacting the float component and allowing the latter to move the air valve sealing plate away from the air valve seat when the level of liquid contained within the reservoir chamber reaches the predetermined upper threshold value.

Conveniently, the reservoir wall includes a wall upper segment, the air inlet aperture extending through the wall upper segment, the float arm being pivotally attached to the wall upper segment; the float arm including an arm actuating segment and a substantially perpendicular arm spacing segment, the air valve actuating arm being adapted to contact the arm actuating segment.

Typically, the air valve includes an air valve body mounted across the wall upper segment, the air inlet aperture being in fluid communication with an air valve flow channel extending through the air valve body; the air valve actuating arm being slidably inserted within an air valve arm receiving channel also extending through the air valve body.

Conveniently, the liquid pump further comprises a reservoir spacing tube extending from the liquid outlet aperture to the outlet level.

Typically, the reservoir wall includes a wall upper segment and a wall lower segment, the liquid outlet aperture extending through the wall upper segment; the reservoir spacing tube establishing fluid communication between the liquid outlet aperture and the outlet level, the outlet level being positioned substantially adjacent to the wall lower segment.

Conveniently, the reservoir spacing tube is provided with a relatively small vacuum aperture extending therethrough for facilitating the outflow of the air contained within the reservoir chamber as the latter is being filled by the liquid.

Typically, the liquid pump further comprises a chamber drain for allowing selective drainage of the liquid contained in the reservoir chamber.

Conveniently, the chamber drain prevents drainage of the liquid contained in the reservoir chamber when a predetermined level of vacuum is present is the reservoir chamber and allows drainage of the liquid contained in the reservoir chamber when the vacuum level within the reservoir chamber is lower then the predetermined level of vacuum.

Typically, the reservoir wall includes a wall lower segment, the chamber drain including a drainage aperture extending through the wall lower segment and a drain valve; the drain valve including a drain valve seat and a drain valve ball mounted within perforated ball enclosure for movement selectively in and out of sealing engagement with the drain valve seat depending on the pressure differential between the air pressure in and out of the reservoir chamber.

In accordance with the present invention, there is also provided a method for pumping maple sap emanating from a maple tree through a liquid inlet duct into an liquid outlet duct having a portion thereof located at a higher level then the liquid inlet duct, the method using a liquid pump comprising: a reservoir having a reservoir wall enclosing a reservoir chamber; a liquid inlet aperture extending through the reservoir wall for fluid coupling to the liquid inlet duct; a liquid outlet aperture extending through the reservoir wall for fluid coupling to the liquid outlet duct, the liquid outlet aperture being in fluid communication with an outlet level inside the reservoir chamber located below the liquid inlet aperture and corresponding to a predetermined lower threshold value of the volume of the liquid within the reservoir chamber; an air aperture extending through the reservoir wall for pneumatically coupling the reservoir chamber with the atmospheric air located exteriorly to the reservoir; a liquid inlet valve operationally coupled to the liquid inlet aperture, the liquid inlet valve being operable between a liquid valve open configuration and a liquid valve closed configurations for respectively allowing and preventing the flow of a fluid through the liquid inlet aperture; an air valve operatively coupled to the air aperture, the air inlet valve being operable between an air valve open configuration and an air valve closed configurations for respectively allowing and preventing the flow of air through the air aperture; a volume responsive first actuating means for selectively moving the liquid inlet valve to the liquid valve closed configuration and the air valve to the air valve open configuration upon the volume of liquid within the reservoir reaching a predetermined upper threshold value; a volume and pressure responsive second actuating means for selectively moving the liquid inlet valve to the liquid valve open configuration and the air valve to the air valve closed configuration upon the volume of liquid within the reservoir reaching the predetermined lower threshold value and the pressure differential between the air pressure inside and outside the reservoir reaching a predetermined differential threshold; the method comprising the steps of:

hydraulically coupling the liquid inlet duct to the liquid inlet aperture and the liquid outlet duct to the liquid outlet aperture; providing a by-pass duct for fluidly coupling the liquid inlet and outlet ducts respectively upstream and downstream from the liquid pump;

creating a vacuum in the liquid inlet and outlet ducts.

Advantages of the present invention include that the proposed pumping system allow a liquid flowing through a partially or fully vacuumed hydraulic circuitry to be raised against the action of gravity to a higher level.

Also, the proposed system is specifically designed to be used in various settings including settings wherein electrical or other types of energy are scarce. More specifically, the proposed pumping system is designed so as to be usable without external sources of energy outside that created by the vacuum in the hydraulic circuitry.

Furthermore, the proposed pumping system is designed so as to be reliable without requiring elaborate maintenance with a minimal amount of moving parts, thus being less subject to friction, wear and vibration.

Still furthermore, the proposed pumping system is designed so as to be manufacturable using conventional forms of manufacturing so as to provide a pumping system that will be economically feasible, long-lasting and relatively trouble-free in operation.

BRIEF DESCRIPTION OF THE DRAWINGS

An embodiment of the present invention will now be disclosed, by way of example, in reference to the following drawings in which.

DETAILED DESCRIPTION

Figure 1:
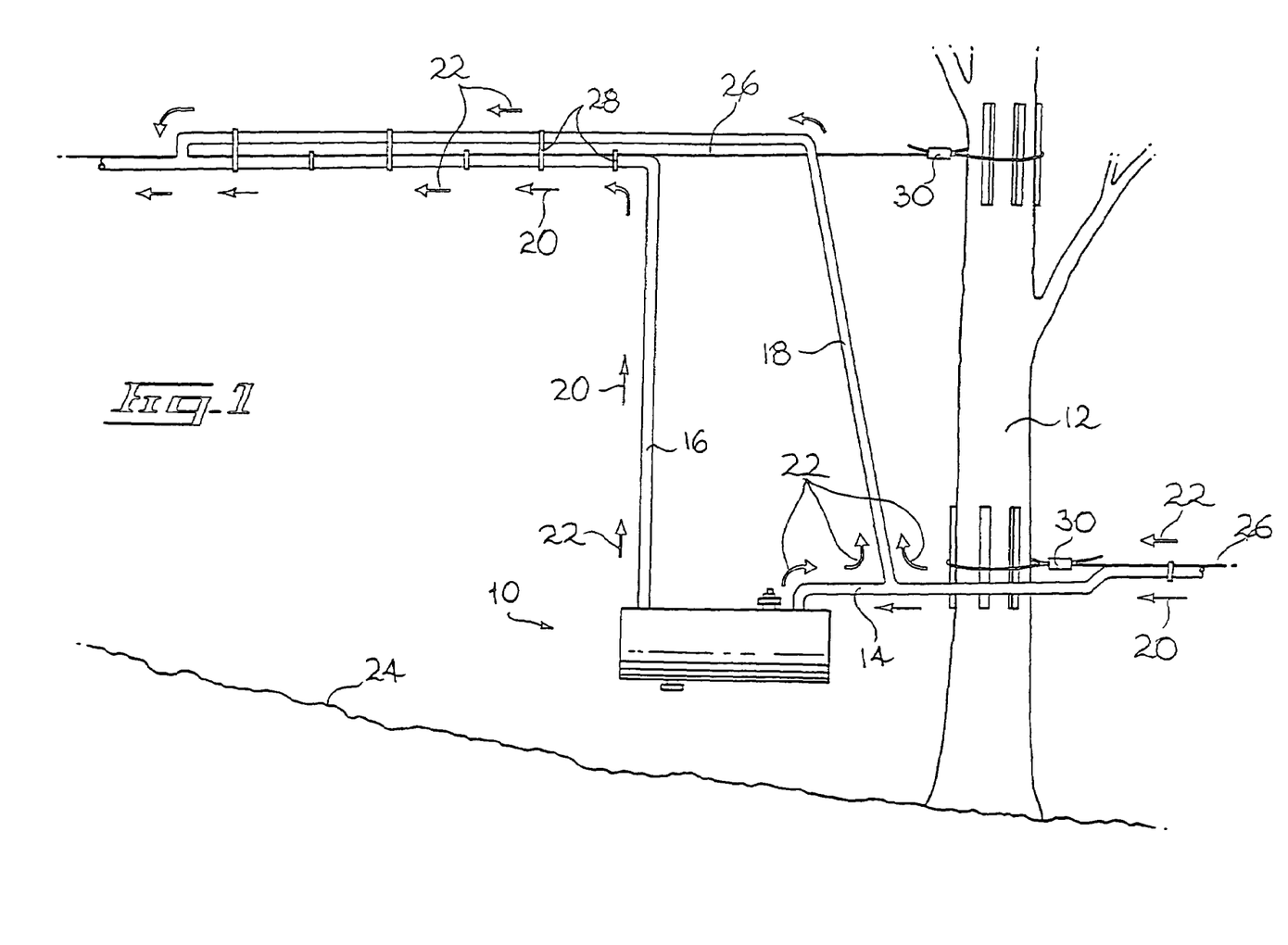
FIG. 1: in a schematic elevational view, illustrates part of a pumping system in accordance with an embodiment of the present invention, the pumping system being shown fluidly connected to collecting ducts and attached to a schematized maple tree.

Referring to FIG. 1, there is shown in a schematic partial view, an air driven liquid pump in accordance with an embodiment of the present invention generally designated by the reference numeral 10. The liquid pump 10 is shown fluidly coupled to a hydraulic circuitry used for carrying maple sap emanating from maple trees such as schematically represented and identified by the reference numeral 12 to a sugar shack (not shown but located at a higher level than the liquid pump 10 and arbitrarily located in a direction towards the left hand side of FIG. 1). It should be understood that the liquid pump 10 could be used in other contexts and with other types of hydraulic circuitry without departing from the scope of the present invention.

The liquid pump is typically used for pumping a target volume of liquid, such as maple sap, emanating from a liquid inlet duct 14 into a liquid outlet duct 16. Both the liquid inlet and outlet ducts 14,16 are subjected to at least a partial air vacuum. The air vacuum is created by a vacuum pump typically located adjacent to or in a sugar shack (not shown). The vacuum pump (not shown) is calibrated and used for extracting the maple sap from maple trees such as the maple tree schematically represented and indicated by the reference numeral 12.

The outlet duct 16 is typically fluidly coupled to another segment of the hydraulic circuitry which may or may not incorporate another liquid pump 10, or to a maple sap collecting tank located inside or adjacent to the sugar shack (not shown). The liquid inlet and outlet ducts 14, 16 are fluidly coupled together respectively upstream and downstream from the liquid pump 10 by a bypass duct 18 extending therebetween. In FIG. 1, the flow direction of the maple sap within ducts 14, 16 is indicated schematically by the thinner arrows 20, while the flow direction of air within ducts 14, 16 and 18 created by the vacuum pump is indicated schematically by the thicker arrows 22.

The hydraulic circuitry, including the liquid pump 10, is typically maintained above the ground surface 24 by a corresponding circuitry supporting system. The circuitry supporting system may take any suitable form without departing from the scope of the present invention. In the embodiment shown in FIG. 1, the circuitry supporting system includes supporting cables 26 attached to the ducts 14, 16 and/or 18 using conventional cable-to-duct attachment rings 28. The supporting cables 26 are typically suspended to the maple trees 12 by forming a loop around the tree truck thereof, the loop being typically secured by a cable attachment clap 30.

Figure 2:
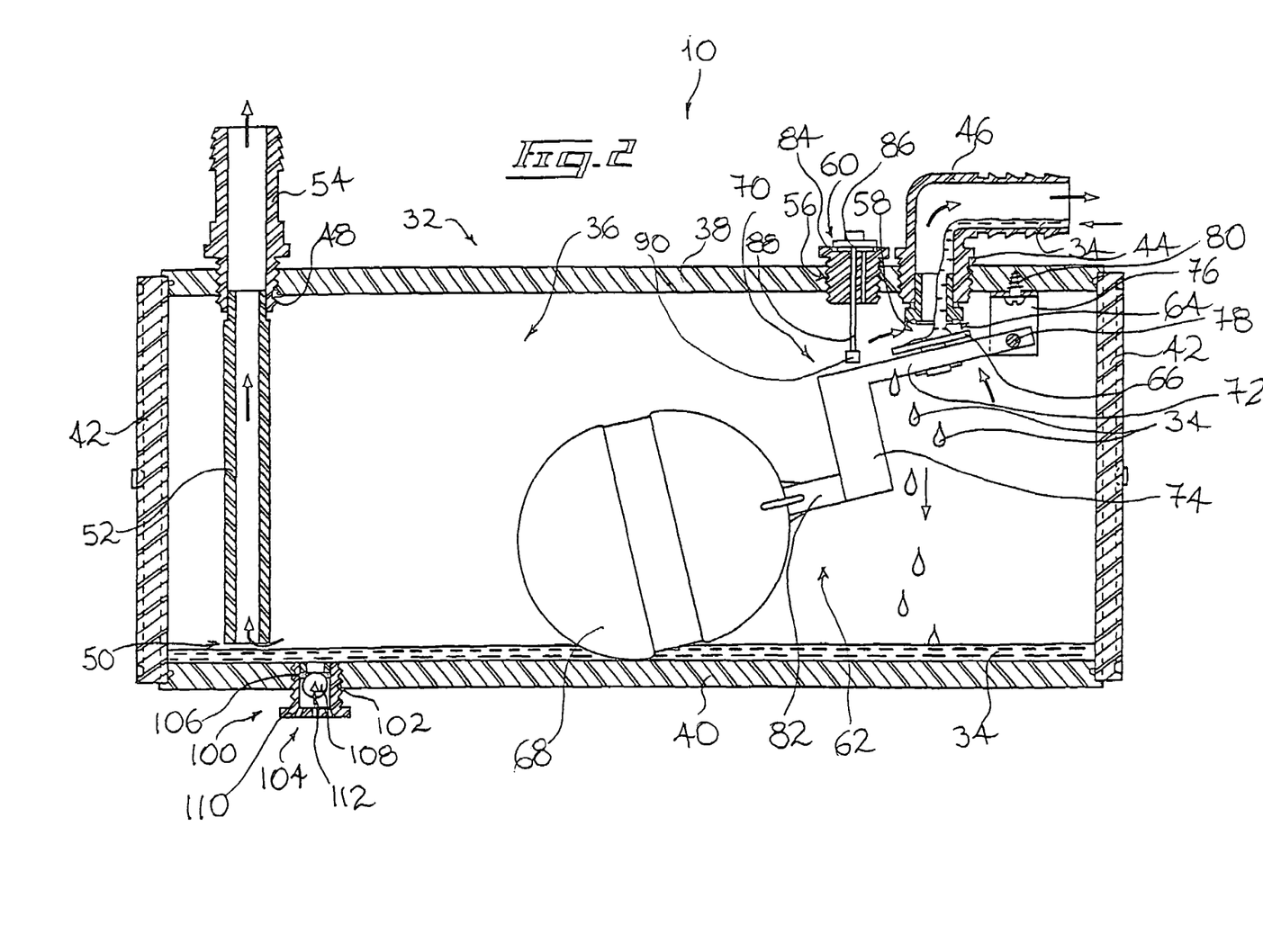
FIG. 2: in a cross-sectional view, illustrates some of the components part of the pumping system shown in FIG. 1, the components being shown as a negative pressure is being built in the hydraulic circuitry and a small quantity of maple sap enters the pumping system container.

Referring now more specifically to FIG. 2, there is shown some of the components of the liquid pump 10. The liquid pump 10 includes a tank or reservoir 32 for collecting the maple sap or liquid 34. The reservoir 32 has a reservoir wall enclosing a reservoir chamber 36.

Although the reservoir 32 is shown in the Figures as having a substantially parallelepiped-shaped configuration, it should be understood that the reservoir 32 could have other configurations without departing from the scope of the present invention.

Typically, the reservoir wall includes a wall upper segment 38, a wall lower segment 40 and a wall peripheral segment 42 extending therebetween.

The liquid pump 10 also includes a liquid inlet aperture 44 extending through the reservoir wall for fluid coupling to the liquid inlet duct 14. In the embodiment shown throughout the Figures, the liquid pump 10 includes a conventional inlet fitting such as a substantially L-shaped inlet fitting 46 for fluidly coupling the liquid inlet duct 14 to the reservoir chamber 36. It should however be understood that other types of coupling could be used without departing from the scope of the present invention.

The liquid pump 10 also includes a liquid outlet aperture 48 extending through the reservoir wall for fluid coupling to the liquid outlet duct 16. The liquid outlet aperture 48 is in fluid communication with an outlet level inside the reservoir chamber 36 located below the liquid inlet aperture 44 and corresponding to a predetermined lower threshold value of the volume of the liquid within the reservoir chamber 36.

In the embodiment shown throughout the Figures, the liquid outlet aperture is put into fluid communication with the outlet level 50 by a reservoir spacing tube 52 extending from the liquid outlet aperture 48 to the outlet level 50. Typically, although both the liquid inlet and outlet apertures 44, 48 extend through the wall upper segment 38 while the outlet level 50 is positioned substantially adjacent to the wall lower segment 40.

In the embodiment shown throughout the Figures, a conventional outlet fitting such as is substantially rectilinear outlet fitting 54 is inserted into the liquid outlet duct 16 for fluidly coupling the reservoir chamber 36 to the liquid outlet duct 16. Again, it should be understood that other coupling means could be used without departing from the scope of the present invention. Also, other means could be used for establishing fluid communication between the liquid outlet aperture 48 and the outlet level 50. For example, the liquid outlet aperture 48 could be located substantially adjacent to the wall lower segment 40 instead of through the wall upper segment 38.

The liquid pump 10 further includes an air aperture 56 extending through the reservoir wall for pneumatically coupling the reservoir chamber 36 with the atmospheric air located exteriorly through the reservoir 32. Typically, all though by no means exclusively, the air aperture 56 extends through the upper wall segment 38.

The liquid pump 10 further includes a liquid inlet valve 58 operationally coupled to the liquid inlet aperture 44. The liquid inlet valve 58 is operable between the liquid valve open configuration, shown in FIGS. 2 through 4 and 6, and a liquid valve closed configuration, shown in FIG. 5, for respectively allowing and preventing the flow of the fluid 34 through the liquid inlet aperture 44.

The liquid pump 10 still further includes an air valve 60 operatively coupled to the air aperture 56. The air valve 60 is operable between an air valve open configuration, shown in FIG. 5, and an air valve closed configuration, shown in FIGS. 2 through 4 and 6, for respectively allowing and preventing the flow of air through the air aperture 56.

The liquid pump 10 further includes a volume responsive first actuating means for selectively moving the liquid inlet valve 58 to the liquid valve closed configuration and the air valve 60 to the air valve open configuration upon the volume of liquid within the reservoir 32 reaching a predetermined upper threshold value. The liquid pump 10 is still further provided with a volume and pressure responsive second actuating means for selectively moving the liquid inlet valve 58 to the liquid valve open configuration and the air valve 60 to the air valve closed configuration upon the volume of liquid within the reservoir reaching the predetermined lower threshold value and the pressure differential between the air pressure inside and outside the reservoir 32 reaching a predetermined differential threshold.

Typically, the liquid pump 10 includes a float component 62 mounted within the reservoir chamber 36 for buoyantly moving within the reservoir chamber 36 according to the level of liquid 34 contained therein. The float component 62 allows selective opening and closing of the liquid inlet valve 58 depending on the level of liquid 34 contained within the reservoir chamber 36. Typically, the liquid pump 10 includes another float component 62 (not shown) or the same float component 62 is also used for allowing selectively opening and closing of the air valve 60 depending on the level of liquid 34 contained in the reservoir chamber 36.

Typically, the liquid inlet valve 58 includes a liquid valve seat 64. Also, the float component 62 includes a liquid valve sealing plate 66 for abuttingly and sealingly contacting the liquid valve seat 64 when the liquid 34 contained within the reservoir chamber 36 reached the predetermined upper threshold value.

Typically, the float component 62 includes a float component buoyant section 68 pivotally attached to the reservoir wall by a pivotable float arm 70. The liquid valve sealing plate 66 is mechanically coupled to the float arm 70. The liquid valve sealing plate 66 is configured, sized and positioned so as to abuttingly and sealingly contact the liquid valve seat 64 when the level of liquid 34 contained within the reservoir chamber 36 reached the predetermined upper threshold value.

In the embodiment of the invention shown throughout the Figures, the float arm 70 is pivotally attached to the wall upper segment 38. Also, the float arm 70 includes an arm-actuating segment 72 and a substantially perpendicular arm spacing segment 74. The liquid valve-sealing disc 66 is mounted on the arm-actuating segment 72.

Typically, although by no means exclusively, the arm actuating segment 72 is pivotally attached to an arm-mounting base 76 by an arm hinge pin 78. The arm-mounting base 76 is, in turn, attached to the wall upper segment 38 through the use of a conventional fastening means, such as a screw 80 or the like. Also, the float component buoyant section 68 is typically attached to the arm spacing segment 74 by a buoyant section-to-arm attachment segment 82.

The air valve 60 includes an air valve seat 84 in an air valve sealing plate 86 for abuttingly and sealingly contacting the air valve seat 84 when the air valve 60 is in the air valve closed configuration. The float component 62 is adapted to move the air valve sealing plate 86 away from the air valve seat 84 when the level of liquid 34 contained within the reservoir chamber 36 reaches the predetermined upper threshold value.

Typically, the air valve 60 further includes an air valve-actuating arm 88. The air valve-actuating arm 88 is attached adjacent to a longitudinal end thereof to the air valve sealing plate 86. The air valve actuating arm 88 has an opposed distal end thereof extending into the reservoir chamber 36 for contacting the float component 62 and allowing the latter to move the air valve sealing plate 86 away from the air valve seat 84 when the level of liquid contained within the reservoir chamber 36 reaches the predetermined upper threshold value.

Typically, the air valve 60 further includes an air valve-actuating arm 88. The air valve-actuating arm 88 is attached adjacent to a longitudinal end thereof to the air valve sealing plate 86. The air valve actuating arm 84 has an opposed distal end thereof extending into the reservoir chamber 36 for contacting the float component 62 and allowing the latter to move the air valve sealing plate 86 away from the air valve seat 84 when the level of liquid contained within the reservoir chamber 36 reaches the predetermined upper threshold value. The air valve-actuating arm 88 is typically provided with an arm abutment tip 90 adapted to contact the arm-actuating segment 72.

Figure 3:
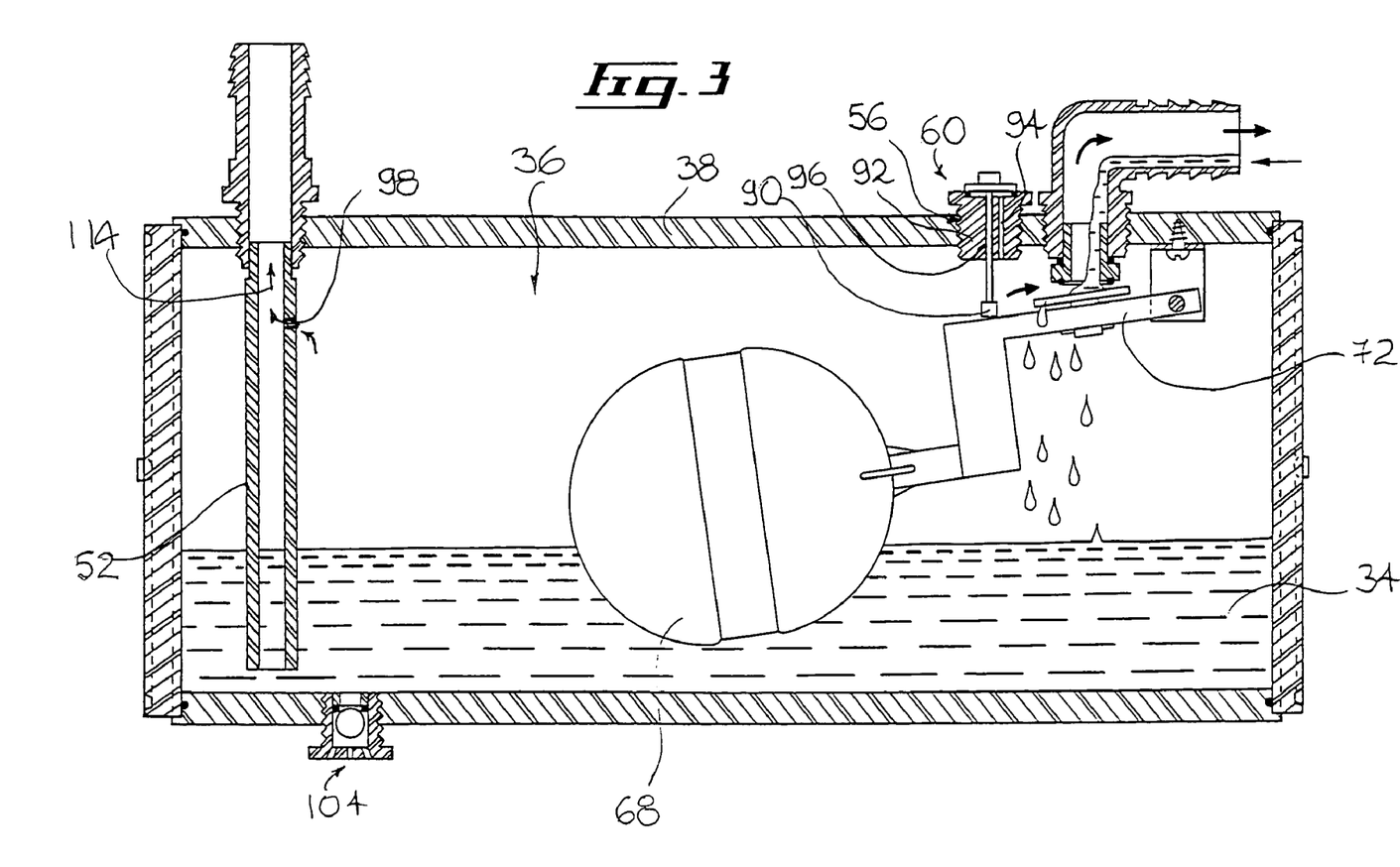
FIG. 3: in a cross-sectional view, illustrates some of the internal components of the pumping system shown in FIGS. 1 and 2 as the level of liquid within the container rise while the air inlet valve part of the system remains in a closed configuration.

As illustrated more specifically in FIG. 3, the air valve 60 typically includes an air valve body 92 mounted across the wall upper segment 38. The air inlet aperture 56 is in fluid communication with an air valve flow channel 94 extending through the air valve body 92. The air valve actuating arm 88 is slidable inserted within an air valve arm-receiving channel 96 also extending through the air valve body 92. The reservoir spacing tube 52 is preferably provided with a relatively small vacuum aperture 98 extending therethrough for facilitating the outflow of the air contained within the reservoir chamber 36 as the latter is being filled by the liquid 34 and, when the sap is being sucked up, allows the mixing of air within the sap therefore reducing the weight of the sap column and therefore increasing the hight at which the sap coulb be sucked up.

Referring back to FIG. 2, there is shown that the liquid pump 10 typically further includes the chamber drains 100 for allowing selective drainage of the liquid 34 contained within the reservoir chamber 36. Preferably, the chamber drains 100 prevents drainage of the liquid 34 contained in the reservoir chamber 36 when a predetermined level of vacuum is present in the reservoir chamber 36 and allows drainage of the liquid 34 contained in the reservoir chamber 36 when the vacuum level within the reservoir chamber 36 is lower than the predetermined level of vacuum.

In the embodiment shown throughout the Figures, the chamber drain 100 includes a drainage aperture 102 extending through the wall lower segment 40 and a drain valve 104. The drain valve 104 includes a drain valve seat 106 and a drain valve ball 108 mounted within the perforated ball enclosure 110 for movement selectively in and out of sealing engagement with the drain valve seat 106 depending on the pressure differential between the air pressures in and out of the reservoir chamber 36.

IN use, with the liquid inlet valve 58 in the liquid valve open configuration and the air valve 60 in the air valve closed configuration, the liquid 34 is allowed to flow into the reservoir chamber 36 for filling the latter while the pressure inside the reservoir chamber 36 is lower by the at least partial air vacuum at a level lower than that of the atmospheric pressure outside of the reservoir 36 so as to create a pressure differential therebetween.

When the volume of liquid 34 within the reservoir chamber 36 reaches the predetermined upper threshold value, the first actuating means opens the air valve 60 allowing the air pressure inside the reservoir chamber 36 to rise so as to pump out the liquid 34 inside the reservoir chamber 36 through the liquid outlet aperture 48. Simultaneously, the first actuating means also closes the liquid inlet valve 58 so as to prevent liquid flow into the reservoir 32, and so as to maintain the at least partial vacuum in the liquid inlet duct 14 through the bypass duct 18 for maintaining the liquid inlet valve 58 in the liquid valve closed configuration while the liquid is being pumped out of the reservoir chamber 36.

When the volume of liquid 34 inside the reservoir chamber 36 falls to the lower threshold value, the air now allowed to flow out of the reservoir chamber 36 through the liquid outlet aperture 48 lowers the pressure inside the reservoir chamber 36 to the predetermined threshold allowing the second actuating means to move the liquid inlet valve 58 to the liquid valve open configuration and the air valve 60 to the air valve closed configuration for a new cycle to begin.

FIGS. 2 through 6 illustrate the configuration of some of the components of the liquid pump 10 during various operational stages of a pumping cycle. FIG. 2 illustrates the liquid inlet valve 58 in the liquid valve open configuration and the air valve 60 in the air valve closed configuration. The air pressure within the reservoir chamber 36 is lower than that outside the reservoir 32 because of the vacuum provided by the vacuum pump (not shown) located typically downstream adjacent or inside the sugar shack (also not shown). The vacuum created by the vacuum pump induces extraction of the maple sap from the maple trees. The extracted maple say then flows through the action of the gravitational force through the liquid inlet duct 14 and through the inlet fitting 46 into the reservoir chamber 36, as indicated by the flow and droplets 34.

The vacuum also creates a suction in the drainage aperture 102 causing the valve ball 108 to move according to arrow 112 to the drain valve closed configuration preventing the liquid 34 contained within the reservoir chamber 36 from being drained therefrom. The liquid 34 emanating from the liquid inlet duct 14 is hence allowed to accumulate within the reservoir chamber 36.

FIG. 3 illustrates an operational stage wherein the level of liquid 34 within the reservoir chamber 34 has risen to a position such that the arm-actuating segment 72 contacts the abutment tip 90. However, the components of the air valve 60 are calibrated so that the force generated by the atmospheric pressure acting on the air valve sealing plates 86 prevent the air valve 60 from being opened until the level of liquid 34 within the reservoir chamber 36 reaches the predetermined upper threshold value. As indicated by arrows 114, since the bottom of the reservoir spacing tube 52 is now emerged into the accumulating volume of liquid 34, the air contained within the reservoir chamber 36 is allowed to escape through the vacuum aperture 98.

Figure 4:
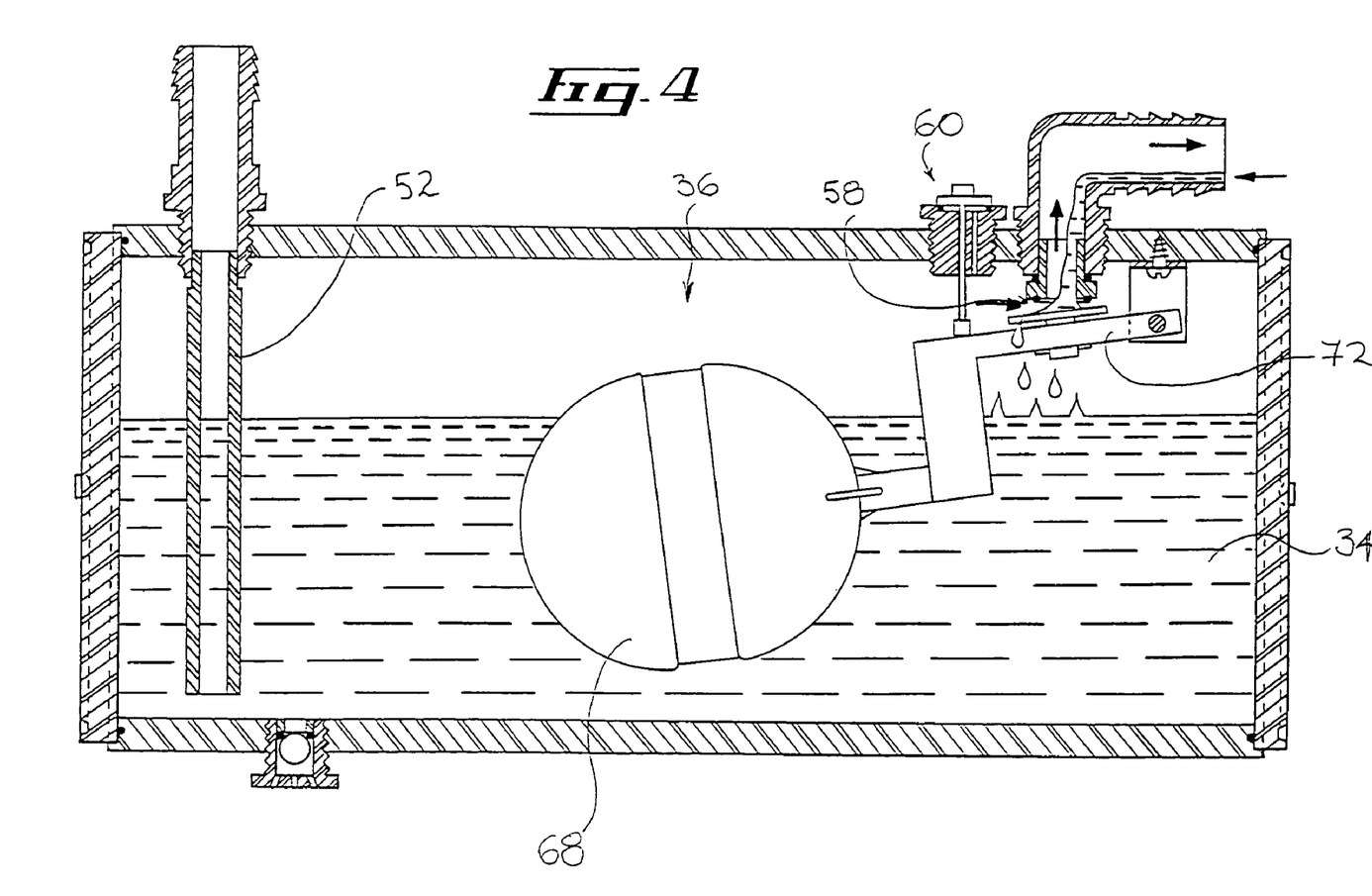
FIG. 4: in a cross-sectional view, illustrates some of the components of the pumping system shown in FIGS. 1 through 3 as the level of water within the container continues to rise and the air inlet valve remains in a closed configuration.

FIG. 4 illustrates an operational stage wherein the level of liquid 34 within the reservoir chamber 36 is approaching the upper threshold value. Typically, although by no means exclusively, the upper threshold value is reached when the level of liquid 34 within the reservoir chamber 36 reaches ¾ of the height of the tank or reservoir chamber 36.

The arm actuating section 72 imparts an increasing pressure on the air valve-sealing disc 86 through the air valve-actuating arm 88. However, the atmospheric pressure outside the reservoir 32 still counterbalances the force generated by the float component buoyant section 68 allowing the air valve 60 to remain in a closed configuration. Also, the liquid inlet valve 58 still allows entry of liquid inside the reservoir chamber 36.

Figure 5:
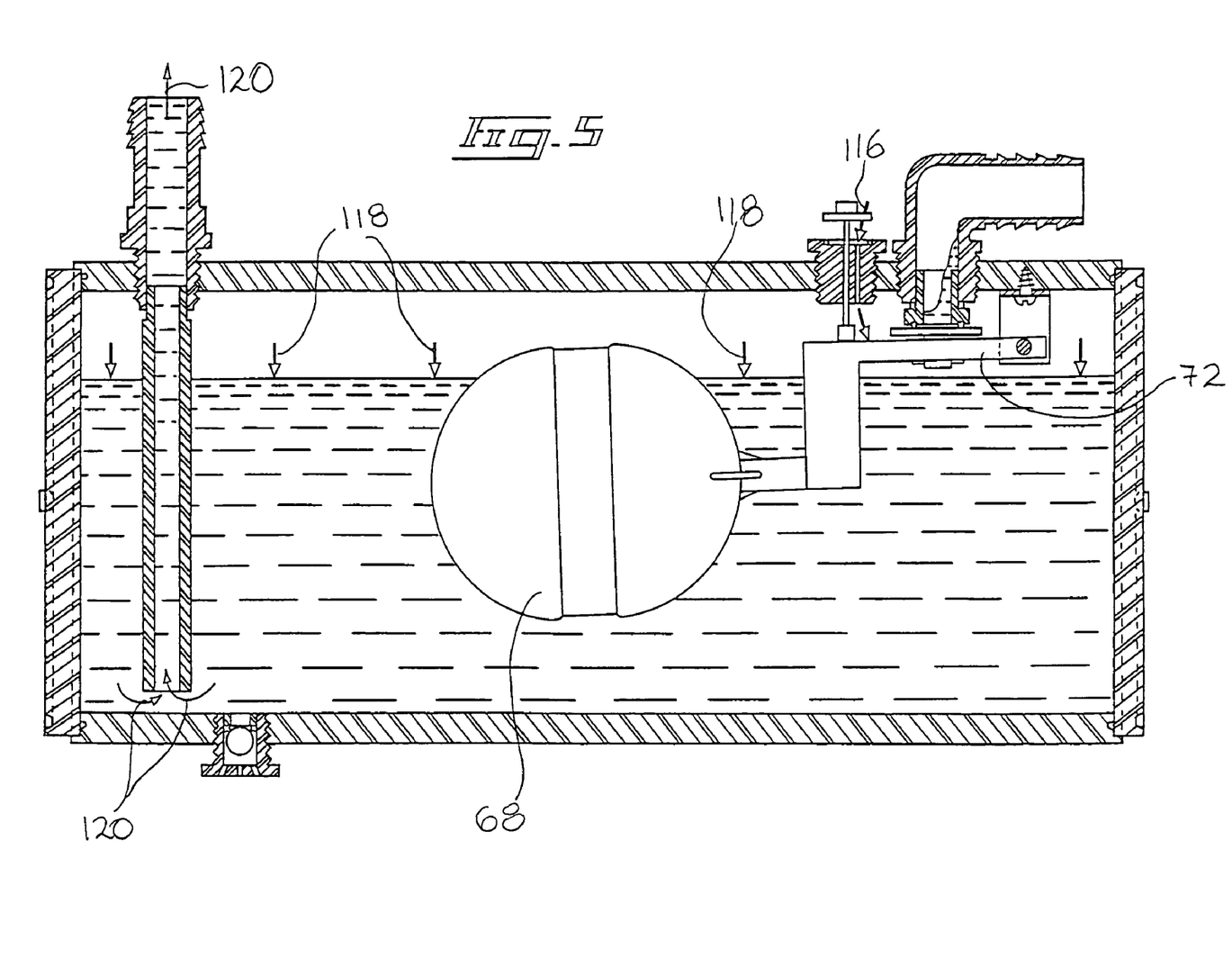
FIG. 5: in a cross-sectional view, illustrates some of the components of the pumping system shown in FIGS. 1 through 4 as the level of water within the container has risen to a level such that the air inlet valve is open and the liquid inlet valve is closed.

FIG. 5 illustrates an operational stage wherein the level of liquid 34 within the reservoir chamber 36 has reached the upper threshold value. The position of the flow to component buoyant section 68 has caught the float arm actuating segment 72 to exert pressure on the abutment tip 90, such that the air valve sealing disc 86 is lifted from the air valve seat 84, allowing an inflow of atmospheric air schematically illustrated and indicated by arrows 116, the flow from the exterior of the reservoir 32 into the reservoir chamber 36 through the air valve flow channel 94.

This sudden inflow of atmospheric air, in turn, suddenly increases the air pressure within the reservoir chamber 36 creating a downward force, schematically illustrated and indicated by arrows 118, causing the liquid 34 having accumulated into the reservoir chamber 36 to flow outwardly through the reservoir spacing tube 52 in the outlet fitting 54 towards the liquid outlet duct 16, as indicated by arrows 120.

Simultaneously, the position of the float component buoyant section 68 has also moved the float arm actuating segment 72 in such a position that the liquid valve sealing disc 66 attached thereto now sealing contacts the liquid valve seat 64 hence preventing further inflow of liquid 34 within the reservoir chamber 36.

Closing of the liquid inlet valve 58 also allows the vacuum within the hydraulic circuitry located upstream from the liquid pump 10 to be maintained through the bypass duct. Maintenance of the vacuum within the upstream hydraulic circuitry, in turn, allows the liquid valve sealing disc 66 to be suctioned so as to remain in the liquid valve closed configuration until the liquid 34 within the reservoir chamber 36 has been emptied out of the latter.

Figure 6:
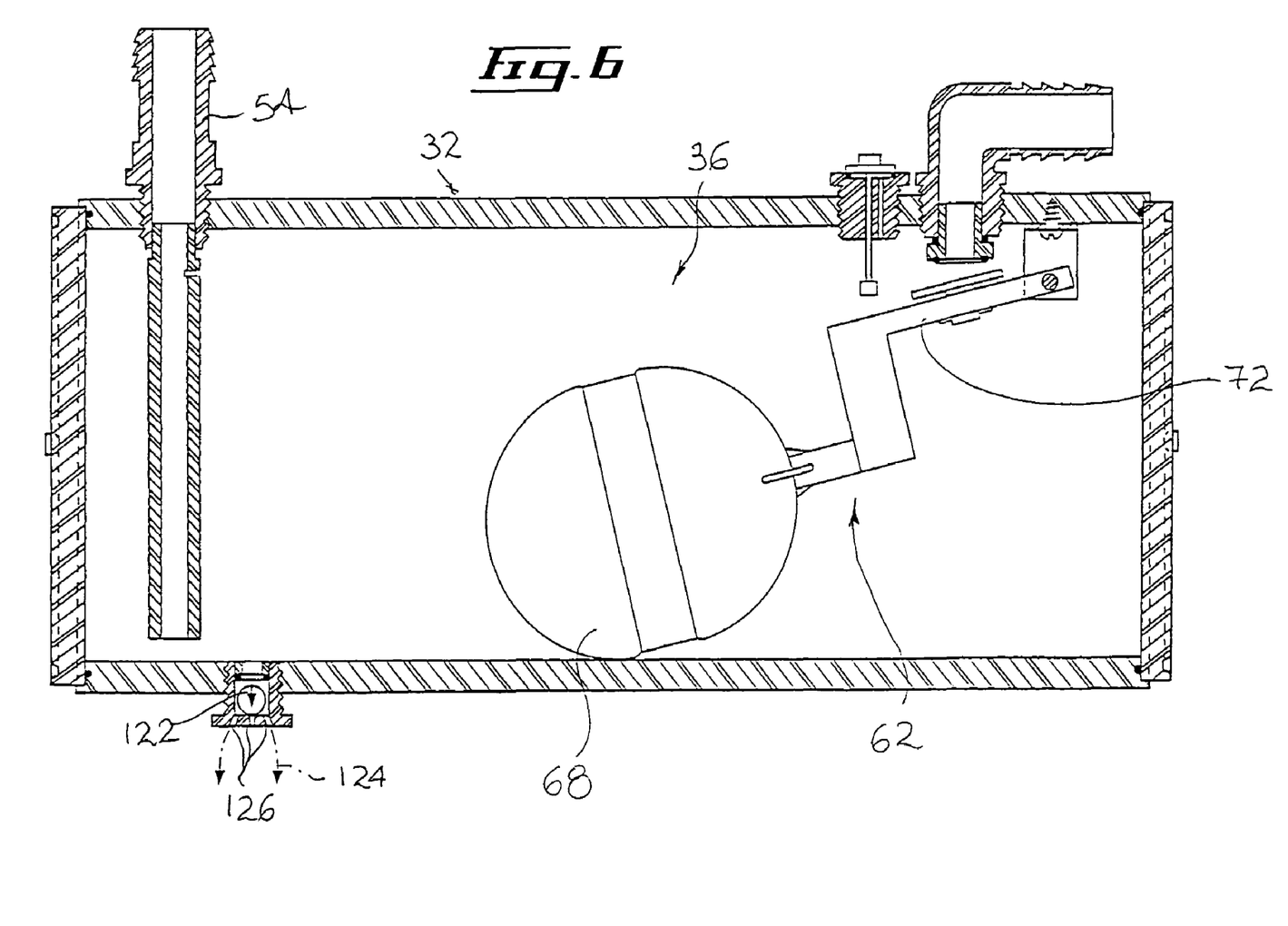
FIG. 6: in a cross-sectional view, illustrates some of the components of the pumping system shown in FIGS. 1 through 5 as the emptied container presents a closed air inlet valve and an open liquid inlet valve.

FIG. 6 illustrates an operational stage wherein the reservoir chamber 36 has been emptied from the liquid 34 initially contained therein. As the liquid 34 emptied out of the reservoir chamber 36, the level of liquid 34 within the reservoir chamber 35 eventually reaches a position lower than that of the outlet level 50. Once the outlet level 50 is reached, air begins to be suctioned out of the reservoir spacing tube 52 by the vacuum in the hydraulic circuitry.

The air valve flow channel 94 is calibrated so that the outlet flow of air through the reservoir spacing tube 52 is greater than the inflow of air through the air valve flow channel 94. Accordingly, the air pressure within the reservoir chamber 36 decreases. As the vacuum rebuilds within the reservoir chamber 36, the suction provided by the vacuum at the liquid valve seat 64 is no longer sufficient to hold the air valve sealing disc 66 thereagainst, hence allowing the float arm 70 to pivot downwardly. Downward pivotal movement of the float arm actuating segment 72, in turn, allows the air valve 60 to move towards the air valve closed configuration and the liquid inlet valve to open, initiating a new pumping cycle.

When the sap collecting operation is terminated, the vacuum pump is shut off allowing the pressure within the hydraulic circuitry, including the reservoir 32, to rise to the level of the atmospheric pressure. As the pressure within the reservoir chamber 36 rises, suction on the valve ball 108 decreases, allowing the latter to fall as is indicated by arrow 122, hence opening the drain valve 104. Liquid remaining within the reservoir chamber 36 is allowed to flow, as indicated by arrows 124, through drain valve apertures 126 to prevent liquid remaining in the reservoir chamber 36 from potentially freezing therein.

The embodiments of the invention in which an exclusive privilege or property is claimed are defined as follows:

1. An air driven liquid pump for pumping a target volume of liquid emanating from a liquid inlet duct into a liquid outlet duct, both said liquid inlet and outlet ducts being subjected to at least a partial air vacuum, said liquid inlet and outlet ducts being fluidly coupled together respectively upstream from said liquid pump and downstream from said liquid pump by a by-pass duct extending therebetween, said liquid pump comprising:

a reservoir having a reservoir wall enclosing a reservoir chamber;

a liquid inlet aperture extending through said reservoir wall for fluid coupling to said liquid inlet duct;

a liquid outlet aperture extending through said reservoir wall for fluid coupling to said liquid outlet duct, said liquid outlet aperture being in fluid communication with an outlet level inside said reservoir chamber located below said liquid inlet aperture and corresponding to a predetermined lower threshold value of the volume of said liquid within said reservoir chamber;

an air aperture extending through said reservoir wall for pneumatically coupling said reservoir chamber with the atmospheric air located exteriorly to said reservoir;

a liquid inlet valve operationally coupled to said liquid inlet aperture, said liquid inlet valve being operable between a liquid valve open configuration and a liquid valve closed configurations for respectively allowing and preventing the flow of a fluid through said liquid inlet aperture;

an air valve operatively coupled to said air aperture, said air valve being operable between an air valve open configuration and an air valve closed configurations for respectively allowing and preventing the flow of air through said air aperture;

a volume responsive first actuating means for selectively moving said liquid inlet valve to said liquid valve closed configuration and said air valve to said air valve open configuration upon the volume of liquid within said reservoir reaching a predetermined upper threshold value;

a volume and pressure responsive second actuating means for selectively moving said liquid inlet valve to said liquid valve open configuration and said air valve to said air valve closed configuration upon the volume of liquid within said reservoir reaching said predetermined lower threshold value and the pressure differential between the air pressure inside and outside said reservoir reaching a predetermined differential threshold;

whereby with said liquid inlet valve in said liquid valve open configuration and said air valve in said air valve closed configuration said liquid is allowed to flow into said reservoir chamber for filling the latter while the pressure inside said reservoir chamber is lowered by said at least partial air vacuum at a level lower then that of the atmospheric pressure outside said reservoir so as to create a pressure differential therebetween, when the volume of liquid within said reservoir chamber reaches said predetermined upper threshold value said first actuating means opens said air valve allowing the air pressure inside said reservoir chamber to rise so as to pump out the liquid inside said reservoir chamber through said liquid outlet aperture and, said first actuating means also substantially simultaneously;

closes said liquid inlet valve so as to prevent liquid flow into said reservoir and so as to maintain said at least partial vacuum in said liquid inlet duct through said by-pass duct for maintaining said liquid inlet valve in said liquid valve closed configuration while said liquid is being pumped out of said reservoir chamber, when the volume of liquid inside said reservoir chamber falls to said lower threshold value, the air now allowed to flow out of the reservoir chamber through said liquid outlet aperture lowers the pressure inside said reservoir chamber to said predetermined differential threshold allowing said second actuating means to move said liquid inlet valve to said liquid valve open configuration and said air valve to said air valve closed configuration for a new cycle to begin.

2. A liquid pump as recited in claim 1 further comprising a float component mounted within said reservoir chamber for buoyantly moving within said reservoir chamber according to the level of liquid contained therein, said float component allowing selective opening and closing of said liquid inlet valve depending on the level of liquid contained in said reservoir chamber.

3. A liquid pump as recited in claim 1 further comprising a float component mounted within said reservoir chamber for buoyantly moving within said reservoir chamber according to the level of liquid contained therein, said float component allowing selective opening and closing of said air valve depending on the level of liquid contained in said reservoir chamber.

4. A liquid pump as recited in claim 1 further comprising a float component mounted within said reservoir chamber for buoyantly moving within said reservoir chamber according to the level of liquid contained therein, said float component allowing selective opening and closing of both said liquid inlet valve and said air valve depending on the level of liquid contained in said reservoir chamber.

5. A liquid pump as recited in claim 1 further comprising a float component mounted within said reservoir chamber for buoyantly moving within said reservoir chamber according to the level of liquid contained therein, said float component allowing selective opening and closing of said liquid inlet valve depending on the level of liquid contained in said reservoir chamber; said liquid inlet valve including a liquid valve seat, said float component including a liquid valve sealing plate for abuttingly and sealingly contacting said liquid valve seat when the level of liquid contained within said reservoir chamber reaches said predetermined upper threshold value.

6. A liquid pump as recited in claim 5 wherein said float component includes a float component buoyant section pivotally attached to said reservoir wall by a pivotable float arm, said liquid valve sealing plate being mechanically coupled to said float arm, said liquid valve sealing plate being configured, sized and positioned so as to abuttingly and sealingly contact said liquid valve seat when the level of liquid contained within said reservoir chamber reaches said predetermined upper threshold value.

7. A liquid pump as recited in claim 6 wherein said reservoir wall includes a wall upper segment, said liquid inlet aperture extending through said wall upper segment, said float arm being pivotally attached to said wall upper segment; said float arm including an arm actuating segment and a substantially perpendicular arm spacing segment, said liquid valve sealing disc being mounted on said arm actuating segment.

8. A liquid pump as recited in claim 1 further comprising a float component mounted within said reservoir chamber for buoyantly moving within said reservoir chamber according to the level of liquid contained therein, said float component allowing selective opening and closing of said air valve depending on the level of liquid contained in said reservoir chamber; said air valve including an air valve seat and an air valve sealing plate for abuttingly and sealingly contacting said air valve seat when said air valve is in said air valve closed configuration; said float component being adapted to move said air valve sealing plate away from said air valve seat when the level of liquid contained within said reservoir chamber reaches said predetermined upper threshold value.

9. A liquid pump as recited in claim 8 wherein said air valve includes an air valve actuating arm, said air valve actuating arm being attached adjacent a longitudinal end thereof to said air valve sealing plate, said air valve actuating arm having an opposed distal end thereof extending into said reservoir chamber for contacting said float component and allowing the latter to move said air valve sealing plate away from said air valve seat when the level of liquid contained within said reservoir chamber reaches said predetermined upper threshold value.

10. A liquid pump as recited in claim 9 wherein said reservoir wall includes a wall upper segment, said air inlet aperture extending through said wall upper segment, said float arm being pivotally attached to said wall upper segment; said float arm including an arm actuating segment and a substantially perpendicular arm spacing segment, said air valve actuating arm being adapted to contact said arm actuating segment.

11. A liquid pump as recited in 10 wherein said air valve includes an air valve body mounted across said wall upper segment, said air inlet aperture being in fluid communication with an air valve flow channel extending through said air valve body; said air valve actuating arm being slidably inserted within an air valve arm receiving channel also extending through said air valve body.

12. A liquid pump as recited in claim 1 further comprising a reservoir spacing tube extending from said liquid outlet aperture to said outlet level.

13. A liquid pump as recited in claim 12 wherein said reservoir wall includes a wall upper segment and a wall lower segment, said liquid outlet aperture extending through said wall upper segment; said reservoir spacing tube establishing fluid communication between said liquid outlet aperture and said outlet level, said outlet level being positioned substantially adjacent to said wall lower segment.

14. A liquid pump as recited in claim 12 wherein said reservoir spacing tube is provided with a relatively small vacuum aperture extending therethrough for facilitating the outflow of the air contained within said reservoir chamber as the latter is being filled by said liquid.

15. A liquid pump as recited in claim 1 further comprising a chamber drain for allowing selective drainage of the liquid contained in said reservoir chamber.

16. A liquid pump as recited in claim 15 wherein said chamber drain prevents drainage of the liquid contained in said reservoir chamber when a predetermined level of vacuum is present is said reservoir chamber and allows drainage of the liquid contained in said reservoir chamber when the vacuum level within said reservoir chamber is lower then said predetermined level of vacuum.

17. A liquid pump as recited in claim 15 wherein said reservoir wall includes a wall lower segment, said chamber drain including a drainage aperture extending through said wall lower segment and a drain valve; said drain valve including a drain valve seat and a drain valve ball mounted within perforated ball enclosure for movement selectively in and out of sealing engagement with said drain valve seat depending on the pressure differential between the air pressure in and out of said reservoir chamber.

18. A method for pumping maple sap emanating from a maple tree through a liquid inlet duct into an liquid outlet duct having a portion thereof located at a higher level then said liquid inlet duct, said method using a liquid pump comprising:
  a reservoir having a reservoir wall enclosing a reservoir chamber;
  a liquid inlet aperture extending through said reservoir wall for fluid coupling to said liquid inlet duct;
  a liquid outlet aperture extending through said reservoir wall for fluid coupling to said liquid outlet duct, said liquid outlet aperture being in fluid communication with an outlet level inside said reservoir chamber located below said liquid inlet aperture and corresponding to a predetermined lower threshold value of the volume of said liquid within said reservoir chamber;
  an air aperture extending through said reservoir wall for pneumatically coupling said reservoir chamber with the atmospheric air located exteriorly to said reservoir;
  a liquid inlet valve operationally coupled to said liquid inlet aperture, said liquid inlet valve being operable between a liquid valve open configuration and a liquid valve closed configurations for respectively allowing and preventing the flow of a fluid through said liquid inlet aperture;
  an air valve operatively coupled to said air aperture, said air inlet valve being operable between an air valve open configuration and an air valve closed configurations for respectively allowing and preventing the flow of air through said air aperture;
  a volume responsive first actuating means for selectively moving said liquid inlet valve to said liquid valve closed configuration and said air valve to said air valve open configuration upon the volume of liquid within said reservoir reaching a predetermined upper threshold value;
  a volume and pressure responsive second actuating means for selectively moving said liquid inlet valve to said liquid valve open configuration and said air valve to said air valve closed configuration upon the volume of liquid within said reservoir reaching said predetermined lower threshold value and the pressure differential between the air pressure inside and outside said reservoir reaching a predetermined differential threshold; said method comprising the steps of:
  hydraulically coupling said liquid inlet duct to said liquid inlet aperture and said liquid outlet duct to said liquid outlet aperture;
  providing a by-pass duct for fluidly coupling said liquid inlet and outlet ducts respectively upstream and downstream from said liquid pump;
  creating a vacuum in said liquid inlet and outlet ducts.

* * * * *